(12) United States Patent
Rockwell et al.

(10) Patent No.: US 7,860,360 B2
(45) Date of Patent: Dec. 28, 2010

(54) MONOLITHIC SIGNAL COUPLER FOR HIGH-ASPECT RATIO SOLID-STATE GAIN MEDIA

(75) Inventors: David Alan Rockwell, Culver City, CA (US); Vladimir V. Shkunov, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/358,901

(22) Filed: Jan. 23, 2009

(65) Prior Publication Data

US 2010/0189392 A1  Jul. 29, 2010

(51) Int. Cl.
*G02B 6/26* (2006.01)
(52) U.S. Cl. .......................................... 385/50; 385/28
(58) Field of Classification Search ........................ None
See application file for complete search history.

(56) References Cited

U.S. PATENT DOCUMENTS

| | | | |
|---|---|---|---|
| 4,763,975 A * | 8/1988 | Scifres et al. ............... 385/33 |
| 4,815,079 A * | 3/1989 | Snitzer et al. ............... 372/6 |
| 4,848,881 A | 7/1989 | Kahan et al. |
| 5,046,809 A | 9/1991 | Stein |
| 5,285,509 A | 2/1994 | Reeder et al. |
| 5,351,323 A | 9/1994 | Miller et al. |
| 5,386,427 A | 1/1995 | Zayhowski |
| 5,646,773 A | 7/1997 | Injeyan et al. |
| 5,864,644 A | 1/1999 | DiGiovanni et al. |
| 5,909,529 A | 6/1999 | Bhagavatula |
| 5,930,433 A | 7/1999 | Williamson et al. |
| 6,014,391 A | 1/2000 | Byren |
| 6,229,939 B1 | 5/2001 | Komine |
| 6,317,548 B1 | 11/2001 | Rockwell et al. |
| 6,400,871 B1 | 6/2002 | Minden |
| 6,477,295 B1 | 11/2002 | Lang et al. |
| 6,529,318 B1 | 3/2003 | Kaneda et al. |
| 6,888,859 B2 | 5/2005 | Weber et al. |

(Continued)

FOREIGN PATENT DOCUMENTS

WO     03/014785 A1    2/2003

OTHER PUBLICATIONS

Born et al. "The Refracting Telescope", Principles of Optics, Electromagnetic Theory of Propagation, Interference and Diffraction of Light, Chapter 6.3, pp. 267-268, Cambridge University Press, 1968.

(Continued)

*Primary Examiner*—Sung H Pak
(74) *Attorney, Agent, or Firm*—Pillsbury Winthrop Shaw Pittman LLP

(57) ABSTRACT

A coupler and method of coupling a signal beam between from a circular-core fiber to a rectangular-core cross section fiber includes providing a optical coupler having an optical core with a high-aspect ratio cross section at one end and a circular cross section at an opposite end to receive a signal beam having a circular cross section. The signal beam is propagated from the circular fiber to the rectangular-core cross section fiber in a narrow, fast-axis direction while maintaining the size and divergence of the signal beam as it propagates. The signal beam is expanded in size while producing a collimated beam from the circular cross section end to the rectangular-core cross section end in a wide, slow-axis direction.

44 Claims, 5 Drawing Sheets

U.S. PATENT DOCUMENTS

| | | | |
|---|---|---|---|
| 6,944,192 B2* | 9/2005 | Prassas et al. | 372/6 |
| 7,164,818 B2 | 1/2007 | Bryan et al. | |
| 2005/0036738 A1 | 2/2005 | Zhou et al. | |
| 2007/0116409 A1 | 5/2007 | Bryan et al. | |
| 2009/0003770 A1* | 1/2009 | Gill et al. | 385/49 |
| 2009/0041061 A1 | 2/2009 | Shkunov et al. | |

OTHER PUBLICATIONS

Neumann "Wave Beam Guided by a Straight Single-Mode Fiber", Chapter 2.2-2.4, pp. 12-16, Single-Mode Fibers Fundamentals, Springer-Verlag, NY, 1988.

Neumann "The Fundamental Fiber Mode", Chapter 5, pp. 61-141, Single-Mode Fibers Fundamentals, Springer-Verlag, NY, 1988.

Tamir "Waveguide Horns", Chapter 3.5, pp. 125-134, Guided-Wave Optoelectronics, Springer-Verlag, Berlin, 1988.

Bass et al. "Optical Elements", pp. 6.22, Handbook of Optics, vol. 11, Devices, Measurements and Properties, McGraw-Hill, Inc. NY, 1995.

Bass et al. "Axial Gradient Lenses", pp. 9.5, Handbook of Optics, vol. 11, Devices, Measurements and Properties, McGraw-Hill, Inc. NY, 1995.

Taverner et al. "158-uJ Pulses from a Single-Transverse-Mode, Large-Mode-Area Erbium-Doped Fiber Amplifier", pp. 378-380, Optics Letters, vol. 22, No. 6, Mar. 15, 1997, Optical Society of America.

Arkwright et al. "Experimental and Theoretical Analysis of the Resonant Nonlinearity in Ytterbium-Doped Fiber", pp. 798-806, Journal of Lightwave Technology, vol. 16, No. 5, May 1998.

Snyder et al. "Step-Profile Waveguides", Chapter 12, pp. 239-248, Optical Waveguide Theory, Kluwer Academic Pubishers, Boston, 2000.

Koechner "Thermo-Optic Effects and Heat Removal", Chapter 7, pp. 406-468, Optical Sciences, Solid-State Laser Engineering, Fifth Edition, Springer-Verlag, NY, 2000.

Siegman "Propagating Modes in Gain-Guided Optical Fibers", pp. 1617-1628, Optical Society of America, vol. 20., No. 8, Aug. 2003.

Hecht "Optical Systems", Chapter 5.7, pp. 209, Optics, Fourth Edition, Pearson Education, Singapore, 2004.

Witkowska et al. "All-Fiber Anamorphic Core-Shape Transitions", pp. 2672-2674, Optics Letters, vol. 31, No. 18, Sep. 15, 2006, Optical Society of America.

Ramachandran et al. "Scaling to Ultra-Large-Aeff Using Higher-Order-Mode Fibers", 2 pp., CThAA2, Conference on Lasers and Electro-Optics 2006 Technical Digest, Optical Society of America.

Oh et al. "Increased Pulsed Amplifier Efficiency by Manipulating the Fiber Dopant Distribution", 2 pp., CTuQ3, Conference on Lasers and Electro-Optics 2006 Technical Digest, Optical Society of America.

Dong et al. "Leakage Channel Optical Fibers with Large Effective Area", pp. 1689-1697, vol. 24, No. 8, Aug. 2007, Optical Society of America.

Marciante "Gain Filtering for Single-Spatial-Mode Operation of Large-Mode-Area Fiber Amplifiers", 2 pp., JTuA86, Conference on Lasers and Electro-Optics 2007 Technical Digest, Optical Society of America.

Betin et al. "200 W Phase-Conjugate Mirror for CW Radiation", pp. 1-6, ScienceDirect, Optics Communications, Feb. 26, 2008.

Galvanauskas et al. "Effectively-Single-Mode Large Core Passive and Active Fibers with Chirally-Coupled-Core Structures", 2 pp., CMB1, Conference on Lasers and Electro-Optics 2008 Technical Digest, Optical Society of America.

Koplow et al. "Single-Mode Operation of a Coiled Multimode Fiber Amplifier", pp. 442-444, Optics Letters, vol. 25, No. 7, Apr. 1, 2000, Optical Society of America.

Feugnet et al., "High-Efficiency Temoo ND: YV04 Laser Longitudinally Pumped by a High-Power Array", Optics Letts., OSA, Optical Society of America, vol. 20, No. 2, pp. 157-159 (1995).

International Search Report & Written Opinion dated May 12, 2010 of PCT/US2010/021795 filed Jan. 22, 2010 (15 pages).

* cited by examiner

- Quarter-pitch length ~ 16 mm
- Combination of curved fast-axis claddings and parabolic planar index profile

MONOLITHIC SIGNAL COUPLER FOR HIGH-ASPECT RATIO SOLID-STATE GAIN MEDIA

BACKGROUND

This disclosure relates generally to the field of optics and, more specifically, to systems and methods for an optical coupling between a circular-cross section beam and a high aspect ratio cross section beam.

Gain media based on optical fibers (fiber lasers and amplifiers) are of intense interest due to a broad range of performance features, including high efficiency, robust single-mode output, high reliability, compact coiled packaging, large surface-area-to-volume ratio for favorable thermal performance, and an all-fiber architecture without any free-space optics and hence no requirement for a rigid optical bench. Over the past decade, output of fiber lasers have been increased several orders of magnitude, from the watt-level in the mid-1990's, to multi-kW powers over the past few years.

Several free-space optics methods are known to be effective for changing a beam format from a collimated round shape to a collimated elliptical shape. A single cylindrical lens is often used for free-space coupling of a circular beam into a planar waveguide, which is located at a focus or image plane of the lens. Various alternatives of this basic approach have been employed, some involving three cylindrical lenses rather than two spherical lenses and one cylindrical lens. But the basic functioning of the lenses remains unchanged. The disadvantage of this free-space approach is that it is bulky, requiring at least three lenses set in a row. Moreover, an integrated version of this technical approach is not possible, thus resulting in increased manufacturing costs.

The most common method of beam re-formatting involves a telescope that usually consists of two lenses, which are separated by a distance equal to a sum of their focal lengths, and with the lenses sharing a common focal plane. The cylindrical telescope, which incorporates two cylindrical lenses with parallel orientation of the axes, is often used to reformat a beam with respect to one axis only. In principle, such a telescope does not affect the beam size and collimation of the other axis. Moreover, such a free-space telescope is not an integrated, all-glass design. Nevertheless, one should note that fiber-based telecom components, such as isolators, actually incorporate very small free-space components such as gradient index (GRIN) lenses, polarizers, optical filters, etc., in a compact robust package that can pass the rigorous Telcordia acceptance test standards. Hence, in the context of the present disclosure it is useful to consider what a fiber-based free-space cylindrical signal coupler would look like.

Assume that cylindrical imaging is used in the narrow fast-axis plane and simple collimation is used in the wide slow-axis plane, and assume further that the circular input fiber has a core diameter of $d=20$ μm and the output fiber has a rectangular core with dimensions of 20 μm×2.5 mm. The beam divergence angle is $\sim \lambda/d$; for a wavelength of 1 μm, this yields an angle of 50 mrad for the circular input fiber. Consequently, a propagation distance of >5 cm is required for this beam to expand to the point that it matches the 2.5-mm wide dimension of the output fiber. Clearly this length is unacceptable. One could certainly replace the single slow-axis lens with a lens pair that would require much less propagation distance, but as the distance is reduced the lens focal lengths must decrease correspondingly. For example, suppose we require the total length of the coupler to be a maximum of 100 mm, and assume a magnification of 125 (which converts 20 μm into 2.5 mm). If we set the longer focal length to occupy essentially the full 100 mm, the shorter focal length must be 0.8 mm to yield the desired magnification. But this type of microlens is difficult to make with high quality, particularly as a cylindrical lens, and it would be very sensitive to alignment. The main point is that free-space optics not only do not meet the requirements for being all-glass, but such an approach would also be very risky even to make a free-space coupler at an acceptable length of ~100 mm. It would be preferable to use shorter couplers, perhaps 10 mm long, which would not be available using this lens arrangement.

A common method of matching a circular-fiber mode to a planar waveguide mode is to use "butt coupling." A polished (or well-cleaved) fiber tip is aligned to point along the waveguide axis, and is set as close as possible to a polished end face of the waveguide. An integrated version of butt coupling exists, too, where the fiber is fused to the planar waveguide end face. However, butt coupling does not offer any way to vary the sizes or divergence angles in the two transverse dimensions. Consequently, if a butt-coupler were to be designed to match the fast-axis dimension and divergence to that of a semi-guiding high-aspect ratio core (SHARC) gain fiber, the signal would grossly underfill, and be highly divergent, in the slow-axis dimension, resulting in high order multimode excitation of the SHARC fiber. Conversely, if the butt coupling were designed to match the parameters of the slow-axis dimension, the signal would grossly overfill the fast-axis direction, and this would significantly lower the system efficiency.

Two all-glass integrated approaches are known for re-formatting optics. The first one refers to tapering the diameter and/or re-shaping the core of a signal fiber. Fiber tapering with proportional scaling of both transverse dimensions of the core and cladding, while maintaining a circular cross-section, is a common practice in fiber optics. Core shape transformation from a circle to a rectangle has been demonstrated as well, in photonic-crystal fibers, for example. This particular method helps to transform a round core to a moderate aspect ratio rectangle, about 1:5. However, the feasibility of employing the same approach to transform a round core to a very high aspect ratio core of interest for SHARC is highly questionable. A drawback of adiabatic re-shaping is that the rate at which the transverse dimensions change with length along the fiber must be very slow to minimize radiative loss into the cladding. This requirement translates into very long lengths for shape-transforming tapers with tight manufacturing tolerances if the lowest-order mode structure and polarization are to be conserved. Tapered planar channels of variable width are also known. But they are used to interconnect two planar channels having different widths, which are located at a common solid substrate, not a fiber. Moreover, a ribbon-shaped flexible planar waveguide tapered along the slow-axis direction has also been proposed. However, this approach serves for reformatting incoherent light, and is not compatible with the requirement to maintain single-mode, collimated operation along the slow-axis direction.

The second integrated approach for re-formatting a guided beam, the use of a GRIN lens, is widely employed within the commercial market for fiber optic components. A GRIN lens is designed as a thin glass rod with mm-scale transverse dimensions. An optical fiber can be fused to one or both flat GRIN-lens end faces. The focusing effect in common GRIN lenses occurs because of a transverse variation of the glass refractive index from the axis to the periphery; this variation is typically achieved by diffusing dopants into a cylindrically shaped glass rod, with a resulting radial gradient in the dopant concentration and, hence, the refractive index. The transverse index gradients results in transverse variations of the optical path for light rays, which is needed for focusing light. GRIN lenses can serve various optical functions as a single compact component. A GRIN lens rod having a "quarter-pitch" length allows a diverging fiber-mode beam to expand into a circular beam and provides its collimation. Doubling the length to a "half pitch" provides imaging of the input end face of the GRIN rod to its output end face.

Commercial GRIN lenses are made with a circular cross section. They collimate and expand a fiber mode in both transverse dimensions simultaneously, and, hence, they cannot be used for changing the beam aspect ratio, as is required for coupling to a SHARC fiber. Meanwhile, a one-dimensional version of a custom GRIN lens integrated into a circular fiber has been proposed. The corresponding planar GRIN lens differs from a conventional cylindrical lens in the following way: the refractive index changes gradually, in a parabolic manner, with respect to only one transverse coordinate.

What is needed is a monolithic high-power signal coupler to transform a circular beam to an elliptical beam between a circular and SHARC fiber, that provides a robust all-fiber amplifier architecture with a long operating lifetime, without extra optical surfaces to be kept clean, and without expensive "fast" optics or precise alignments or the need to maintain a high degree of alignment precision over a wide range of operational thermal and vibrational environments.

SUMMARY

In accordance with various embodiments of this disclosure, a method of coupling a signal beam from a circular-core fiber to a rectangular-core cross section fiber having a narrow, fast-axis direction and a wide, slow-axis direction is disclosed. The method comprises providing an optical coupler having an optical core with a high-aspect ratio cross section to receive a signal beam having a circular cross section; propagating the signal beam through the optical core in a narrow, fast-axis direction while maintaining a size and a divergence of the signal beam; and expanding the signal beam size while producing a collimated beam in a wide, slow-axis direction.

In accordance with various embodiments of this disclosure, a coupler configured to couple a single-transverse-mode signal beam emerging from a round core fiber into a lowest order planar mode of a rectangular core of a semi-guiding high-aspect ratio core fiber is disclosed. The coupler includes an optical core having a high-aspect ratio cross section to receive a signal beam having a circular cross section, wherein the optical coupler is arranged to propagate the signal beam through the optical core in a narrow, fast-axis direction while maintaining a size and a divergence of the signal beam, wherein the optical coupler is arranged to allow the signal beam to expand in size and also to be collimated in a wide, slow-axis direction of the high aspect ratio cross section.

In accordance with various embodiments of this disclosure, a method of coupling a signal beam from a rectangular-core fiber having a narrow, fast-axis direction and a wide, slow-axis direction to a circular-core cross section fiber is disclosed. The method comprises providing an optical coupler having an optical core having a high-aspect ratio cross section; propagating the signal beam through the optical core in a narrow, fast-axis direction while maintaining a size and a divergence of the signal beam; and changing the signal beam size while producing a collimated beam in a wide, slow-axis direction.

In accordance with various embodiments of this disclosure, a coupler configured to couple a single-transverse-mode signal beam emerging from a high-aspect ratio rectangular core fiber to a circular core fiber is disclosed. The coupler includes an optical core having a high aspect ratio cross section, wherein the optical coupler is arranged to propagate the signal beam through the optical core in a narrow, fast-axis direction while maintaining a size and a divergence of the signal beam, wherein the optical coupler is arranged to allow the signal beam to narrow in size in an initially wide, slow-axis direction.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
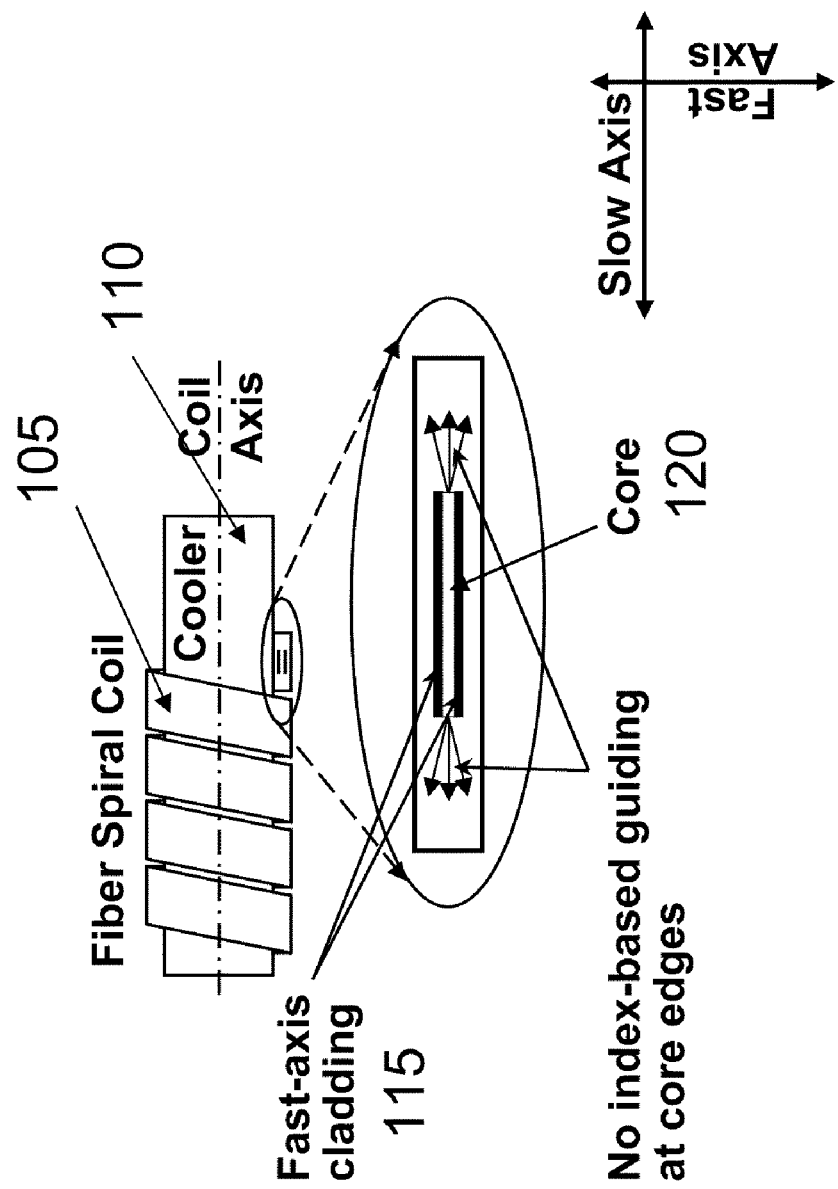
FIG. 1 shows a cross-section of a semi-guiding high-aspect ratio core (SHARC) fiber architecture.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 shows a cross-section of a semi-guiding high-aspect ratio core (SHARC) fiber architecture. As shown, the SHARC fiber 105 is wound in a spiral coil on a mechanical element 110, such as a cooler. A detailed description of the SHARC architecture can be found in co-pending U.S. patent application Ser. No. 11/891,328, filed on Aug. 9, 2007 and entitled "Method and Apparatus for Generation and Amplification of Light in a Semi-Guiding High Aspect Ratio Core Fiber," which is incorporated herein by reference in its entirety. An enlarged cross-section of the encircled area of the fiber 105 is also shown. The fiber 105 includes cladding layers 115 positioned in contact with an optical core region 120, which provide waveguiding in the narrow (fast-axis) direction by way of total internal reflection. In some aspects, the optical core region 120 may be optically active or passive. The material properties of the core 120 are designed to minimize refractive index changes in the wide (slow-axis) direction, particularly the abrupt changes that might occur at the slow-axis edges of the core 120. The core may have a rectangular shape and have an aspect ratio that lies within the range of 30:1 to 100:1 or more, depending on the power goal required for a particular application of the fiber. The power scalability arises from the fact that the slow-axis dimension can be increased linearly with power, such that the power is scaled at a constant intensity. Hence, processes that limit power growth, such as optical damage and stimulated scattering, are held constant as the power is increased. In addition, since the fast-axis dimension is kept small, the SHARC fiber can be coiled as easily as a conventional fiber.

For the SHARC architecture, conventional index-based guiding is employed in only one transverse direction (the fast-axis direction), and this is the origin of the term "semi-guiding." Excellent beam quality is possible even at high powers (wide fibers) if index variations at the slow-axis edges are made sufficiently small. Higher-order planar fast-axis modes are stripped out of the core by coiling the fiber, analogous to the approach used with conventional large-mode area (LMA) fibers. Index-based guiding is not employed in the slow-axis direction, since it would lead to highly multimode operation. Instead, alternative methods of spatial mode control are employed. For applications in which a SHARC fiber is employed as a laser oscillator, one might achieve single-mode performance in the slow-axis direction using a low-Fresnel number resonator in that plane. This type of "long skinny" resonator is well known to produce diffraction-limited output beams. When the SHARC fiber is employed as an amplifier, mode control can be achieved using a combination of mode-dependent gain and mode-dependent loss, such that the lowest-order mode has the greatest gain-loss difference. As will be discussed below, a SHARC fiber structure can be employed in passive (i.e., non-amplifying) fibers and waveguides as well as in active fiber amplifiers.

The present disclosure pertains to the challenge of designing a high-power SHARC fiber that provides an all-fiber amplifier architecture, where individual fiber-based components are spliced to one another. This all-fiber design has an advantage of robustness and long lifetime. In contrast to alternative free-space coupling schemes, the all-fiber designs do not introduce extra optical surfaces to be kept clean, and they also do not require expensive "fast" optics or precise alignments, along with the need to maintain a high degree of alignment precision over a wide range of operational thermal and vibrational environments.

There are at least two specific requirements that must be met in creating an interface between conventional circular-core and SHARC fibers. The first is an optical scheme for reformatting a 20 to 30 μm (or slightly greater) diameter, diverging circular beam into a high-aspect ratio elliptical beam collimated in the slow-axis direction. The narrow dimension of the reformatted beam must remain comparable to the size of the initial beam, but the beam must be expanded in the orthogonal wide dimension to the range of 0.5 mm-1.5 mm (or possibly as large as ~5 mm). The second requirement is that this optical scheme needs to be implemented as an integrated component, i.e., to be small in size, and with a design that allows two very different optical fibers to be spliced to it on the two ends; at the input end is a commercial circular-core fiber, and at the output end is a SHARC fiber.

In one or more embodiments, the present disclosure reformats a circular beam to match a high-aspect ratio rectangular core, with an aspect ratio in the range of 30:1 to 100:1 or more. The re-formatting mechanism is different in the two orthogonal transverse directions.

In an embodiment, in the fast-axis direction, the signal coupler exploits ordinary index-based waveguiding to maintain a constant fast-axis dimension, assuming the circular-core diameter is the same as the thin dimension of the rectangular core. If an application should require that the fast-axis dimensions differ, the fast-axis index-based waveguide could be tapered/expanded along the coupler length, as required to match the output beam to the rectangular-core thin dimension.

In the slow-axis direction, the beam exiting the circular aperture is allowed to freely diffract, with the constraint that the coupler medium should have a graded index profile to function as a 1-D GRIN lens. The coupler length is specified such that the slow-axis GRIN lens is a quarter-pitch length that essentially collimates the diverging beam that leaves the circular-core fiber. The graded index can be accomplished in a number of ways, including profiling the refractive index across the slow-axis coordinate. Additionally, other approaches for implementing the GRIN function will be discussed below.

Figure 2:
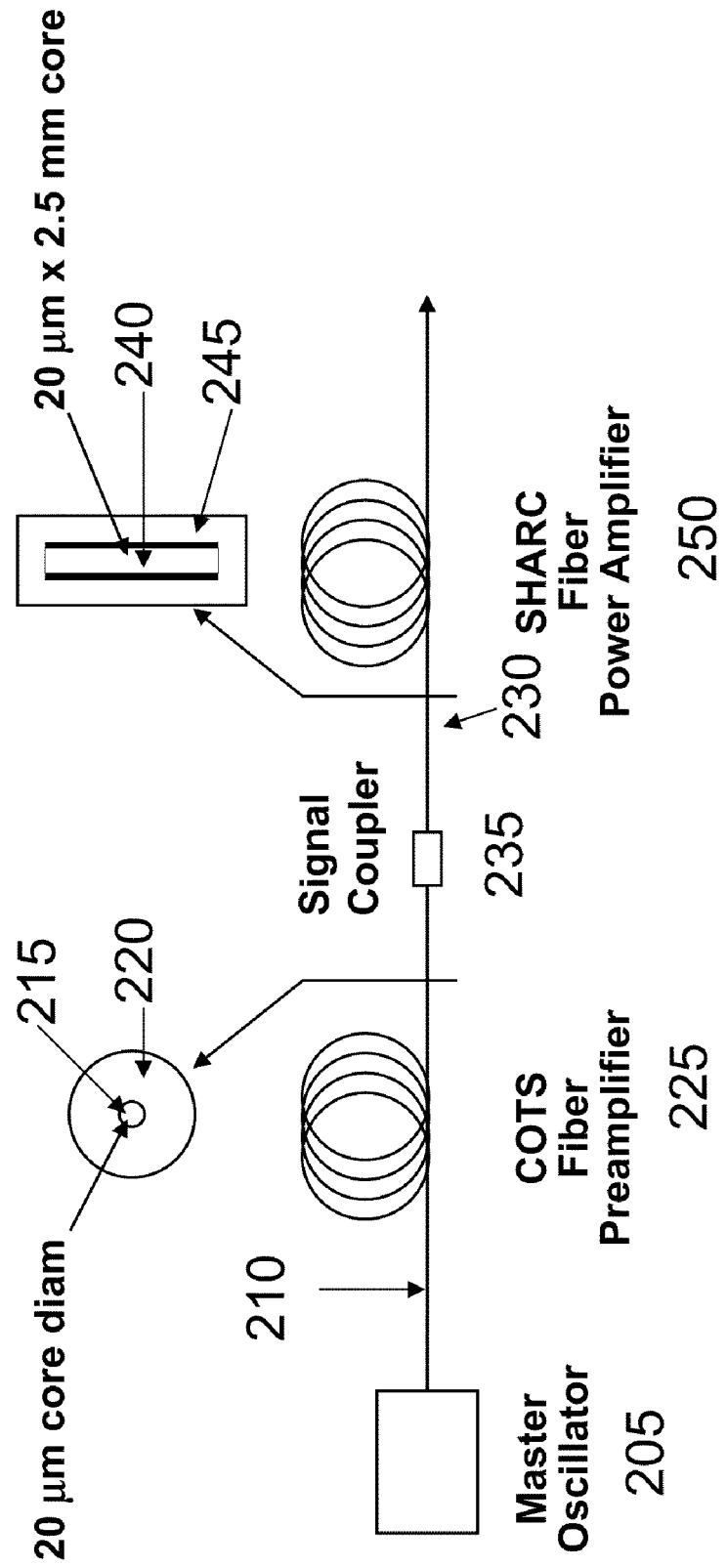
FIG. 2 shows a fiber laser architecture in accordance with an aspect of the disclosure.

FIG. 2 shows a fiber laser architecture in accordance with an embodiment. Master oscillator 205 is configured to generate a beam signal that is propagated along optical fiber 210. Optical fiber 210 is typically a commercial-off-the-self (COTS) circular fiber. The circular fiber includes active core 215 surrounded by cladding 220. As shown, active core has a 20 μm core diameter. The beam signal is preamplified by COTS fiber preamplifer 225. The preamplified signal is coupled to SHARC fiber 230 by way of signal coupler 235. Signal coupler 235, which will be discussed in greater detail below, is configured to transform a circular beam signal emerging from a COTS circular fiber into a beam signal that is configured to propagate along SHARC fiber 230. In some aspects, signal coupler 235 may operate in reverse by transforming a high-aspect ratio signal beam to a signal beam that can propagate along a circular fiber. SHARC fiber 230 has active core 240 surrounded by cladding 245 that has a high-aspect ratio cross section. A "high" aspect ratio cross section may generally be defined as a ratio of 30:1 to 100:1 or more. As shown, core 240 has dimensions of 20 μm×2.5 mm. The beam signal emerging from signal coupler 235 is amplified by SHARC fiber power amplifier 250.

Figure 3:
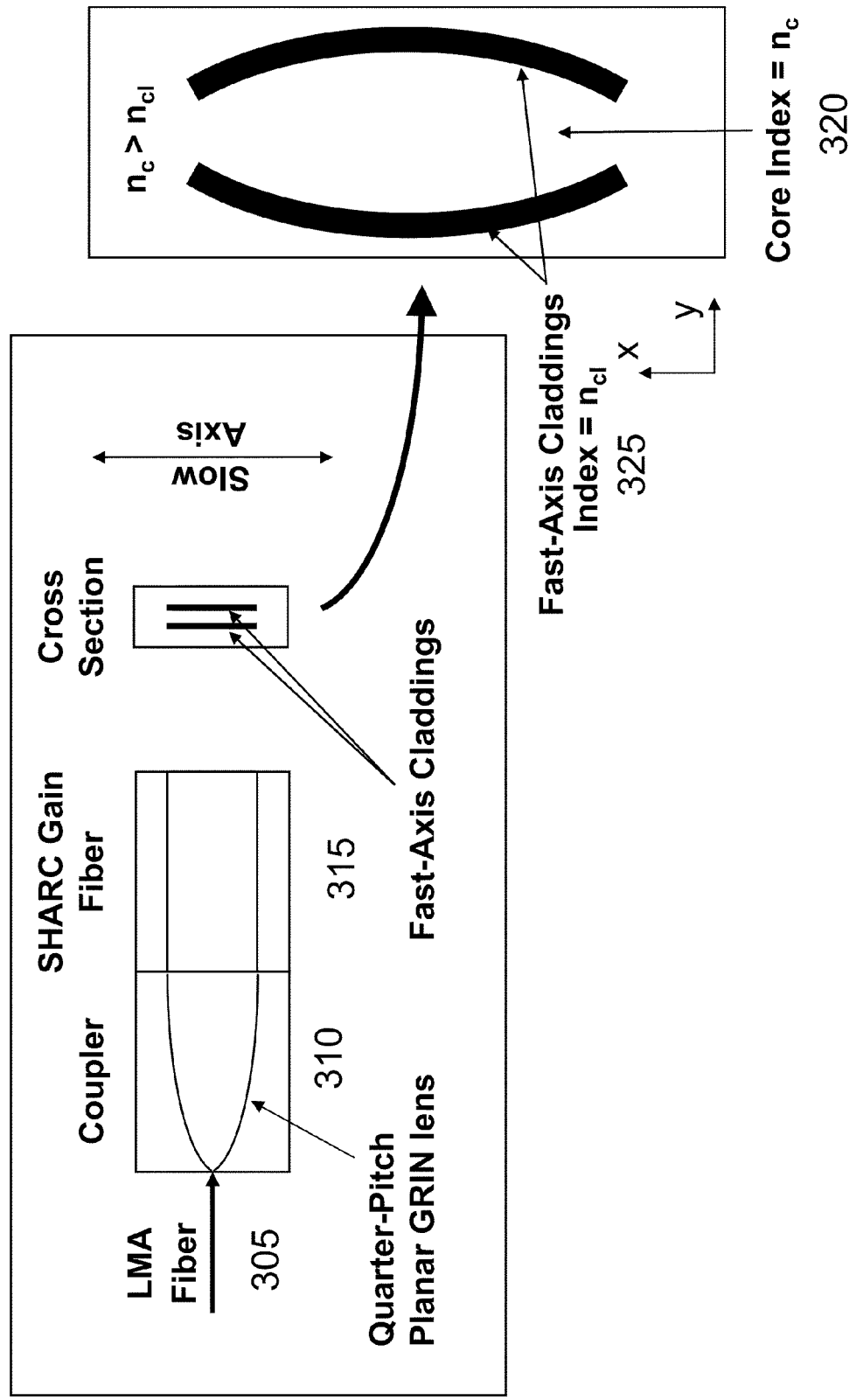
FIG. 3 shows a cross-section of a signal coupler in accordance with an aspect of the present disclosure.

FIG. 3 shows a signal coupler implementing the GRIN function in accordance with an embodiment. Circular COTS fiber 305 carrying a signal beam is coupled to signal coupler 310, which is then coupled to SHARC gain fiber 315. The fiber 305 may be a optical fiber with a large effective mode areas (LMA fiber). Signal coupler 310 includes an optical core 320, which may be made out of fused silica, for example. In some aspects, core 320 may be active or passive. Signal coupler 310 may be directly attached to the circular fiber and high-aspect ratio fiber at either end by way various attachment techniques including bonding, splicing and/or fusing. The optical core 320 has a refractive index $n_c$ and fast-axis cladding 325 has refractive index $n_{cl}$, where $n_c > n_{cl}$. In various aspects, claddings 325 are formed around core 320 in a curved arrangement such that the curvature causes the region between cladding 325 to function as a GRIN lens in the wide, slow-axis direction. Thus, the effective refractive index for the planar mode will be greater along the core axis than along the edges. As will be detailed below, this cladding curvature has an impact on a propagating beam that is analogous to that of a planar refractive-index GRIN lens having a constant core thickness. This is because the effective refractive index for the mode differs from the material index of the core material and depends on the waveguide thickness. The effective index becomes higher in the thicker regions, since a larger fraction of the propagating mode resides within the higher-index core than in the lower-index cladding.

Analytical methods for the analysis of light propagation through planar waveguides are known. These were applied to the particular geometry with the variable-thickness core shown schematically in FIG. 3, and the variations of the effective index of the mode with core thickness h were calculated. The effective index can be represented as $n_{eff}=n_0+(dn_{eff}/dh)\delta h$, where $\delta h$ refers to the thickness variation from an average value $h_0$, while $n_0=n_{eff}(h_0)$ and $(dn_{eff}/dh)$ characterizes the index sensitivity to the variations $\delta h$. For the situation of interest for the SHARC fiber coupler, the refractive-index difference $\Delta n=n_{core}-n_{clad}$ between core and cladding materials is small, and also the V-number of the planar channel, $V=(\pi h/\lambda)\cdot NA \cdot n_{core}$, is large enough to allow a propagation regime involving a few planar modes. For such conditions the sensitivity to core variations were found to be inversely proportional to the thickness: $(dn_{eff}/dh) \approx (\Delta n/2 h)\pi^2/(V+1)^2$. This relation can be used to calculate the focusing power of such a 1-D GRIN lens. First, assume that the thickness has a parabolic dependence on the distance, x, from the fiber axis to the core edges, $h(x)=h_{max}+\delta h(x)$, with $\delta h(x)=-\Delta h\cdot(2x/w)^2$, where w is the channel width. This yields a parabolic profile for the effective index along the slow-axis direction: $n_{eff}(x)=n_0-n_1\cdot x^2$, and $n_1=(4/w^2)\Delta h\cdot(dn_{eff}/dh)$. The focal distance, i.e., quarter-pitch length, for the resulting planar GRIN lens is $L_{1/4}=(\pi/2)(n_0/2n_1)^{1/2}$.

The focusing power of the planar lens can be further enhanced if the core-material refractive index $n_{core}$ is also made to be x-dependent. During preform fabrication, a dopant profile in the core can be tailored to produce a systematic transverse index gradient. It is also possible to apply a spatially varying strain to the core, such that the strain induces the desired transverse gradient in the refractive index. In all of these cases, the analytical model showed that the coupler function can be accomplished in lengths of 5 to 10 mm, and no free-space optics are required.

Figure 4:
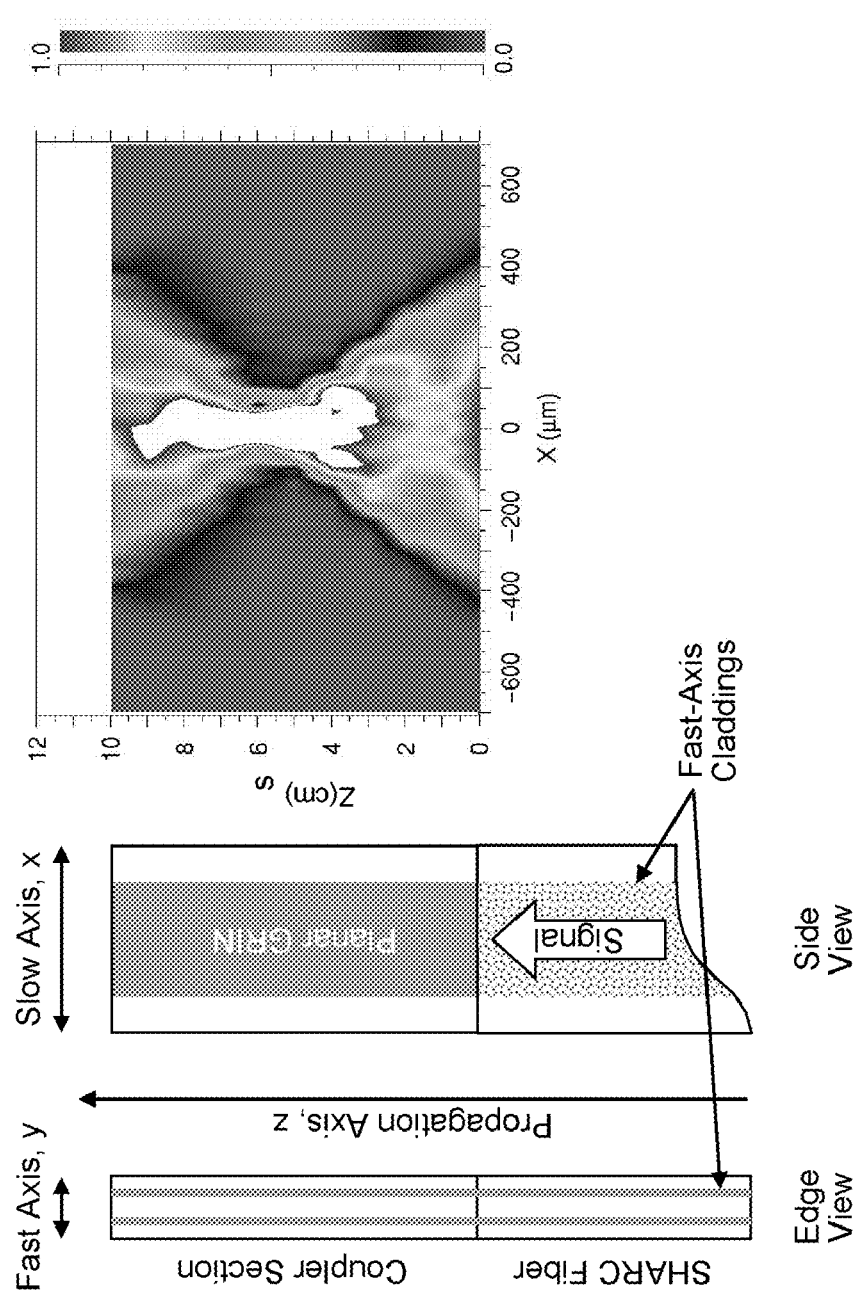
FIG. 4 shows propagation results from a SHARC fiber into a coupler section containing a planar-GRIN region with a ½ pitch length in accordance with an aspect of the present disclosure.

To verify the basic assumptions and the analytical model used, a set of direct 3-D propagation simulations were performed using commercial GLAD software. The configuration as shown in FIG. 3, where the cladding surfaces are curved, was modeled, and the results are shown in FIG. 4. FIG. 4 schematically shows the fiber configuration (left side) and the propagation results (right side). Rather than beginning with a small signal beam that needs to be expanded to fill a SHARC gain fiber, this particular model considered the equivalent complementary problem of a signal originating in a SHARC fiber being focused into a circular cross-section spot by the coupler. As was mentioned above, this type of beam transformation might be employed at the output end of a SHARC fiber laser. The initial slow-axis dimension was 1 mm. The spacing between the fast-axis claddings was 15 µm along the fiber axis and 5 µm at the core edges, corresponding to an effective index difference of $1.6\times 10^{-4}$. As indicated in the figure, the signal propagates along the fiber axis and passes through the boundary between the SHARC fiber and the coupler section. At this point, the beam remains guided in the fast-axis direction, but the beam begins to undergo diffractive propagation in the slow-axis direction under the influence of the curved fast-axis cladding (which functions as a GRIN lens). As is clearly indicated in the signal intensity plot on the right, the influence of the planar GRIN lensing is to systematically concentrate the signal beam along the propagation axis, reaching a minimum spot size at a distance of ~5.5 cm into the coupler section. This propagation study was set up to allow the signal to continue propagating under the influence of the GRIN lensing, and, as can be seen, the input signal profile repeats itself, as expected, after a half-pitch propagation length. For comparison, an analytical study of this same configuration predicts a quarter-pitch length of 5.3 cm, which is in excellent agreement with the propagation results.

Additional propagation modeling was done to indicate the impact of a combination of curved fast-axis claddings and a transverse index profile in the slow-axis direction that results in the gradual index drop by 0.0015 from the axis to the edges. The combination of these two effects produces a much shorter quarter-pitch length of about 1.6 cm. In this case, the signal beam entering the GRIN section was a 20 µm circular spot, and it expanded and was collimated by the planar GRIN section. This result is indicated in FIG. 5, which again shows a total propagation along a half-pitch length, with a very good match to the analytical mode result $L_{1/4}=1.62$ cm.

Figure 5:
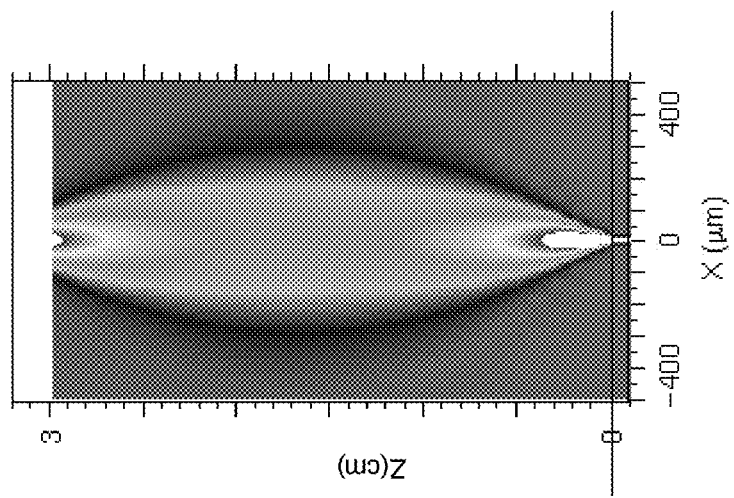
FIG. 5 shows signal propagation with a planar GRIN lens resulting from the combination of curved fast-axis cladding and a parabolic profile in the core refractive index material in accordance with an aspect of the present disclosure.

The propagation results clearly show that the beam aspect ratio can be changed by one or two orders of magnitude while maintaining a constant beam size in the fast-axis direction. The arrangement allows several design degrees of freedom, which allow the desired beam re-formatting to be achieved in propagation lengths in the range of a few mm to several cm. FIGS. 4 and 5 also show fairly relaxed tolerances of ~0.5 cm and ~1 cm in the length required to achieve the desired output-beam profile.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A method of coupling a signal beam from a circular-core fiber to a rectangular-core cross section fiber having a narrow, fast-axis direction and a wide, slow-axis direction, the method comprising:
   providing an optical coupler having an optical core with a high-aspect ratio cross section to receive a signal beam having a circular cross section;
   propagating the signal beam through the optical core in a narrow, fast-axis direction while maintaining a size and a divergence of the signal beam; and
   expanding the signal beam size while producing a collimated beam in a wide, slow-axis direction.

2. The method according to claim 1, further comprising exciting a lowest-order spatial mode of the signal beam in the wide, slow-axis direction.

3. The method according to claim 1, wherein said expanding the signal beam size comprises expanding the size by a factor greater than about 10 in the rectangular-core cross section fiber.

4. The method according to claim 1, wherein the maintaining is accomplished by a passive structure that is configured to guide the signal beam in the narrow, fast-axis direction.

5. The method according to claim 1, wherein in the slow-axis direction, the signal beam is allowed to undergo free diffraction while in the presence of an effective refractive index having a parabolic profile in the slow axis direction in the core of the coupler.

6. The method according to claim 5, wherein the parabolic index profile includes a gradient-index lens in the slow-axis direction.

7. The method according to claim 1, comprising:
attaching the coupler directly at either end to the high-aspect ratio core fiber and to the circular core fiber.

8. The method according to claim 7, wherein the coupler is directly attached by bonding, splicing, and/or fusing the coupler to the high aspect ratio core fiber and to the circular core fiber.

9. The method according to claim 1, wherein the coupler enables a monolithic architecture between the high aspect ratio fiber and the circular core fiber.

10. The method according to claim 1, wherein the optical core is an active core.

11. The method according to claim 1, wherein the optical core is a passive core.

12. A coupler configured to couple a single-transverse-mode signal beam emerging from a round core fiber into a lowest order planar mode of a rectangular core of a semi-guiding high-aspect ratio core fiber, the coupler comprising:
an optical coupler including an optical core having a high-aspect ratio cross section to receive a signal beam having a circular cross section, wherein
the optical coupler is arranged to propagate the signal beam through the optical core in a narrow, fast-axis direction while maintaining a size and a divergence of the signal beam,
wherein the optical coupler is arranged to allow the signal beam to expand in size and also to be collimated in a wide, slow-axis direction of the high aspect ratio cross section.

13. The coupler according to claim 12, wherein the coupler is made as a miniature planar waveguiding channel.

14. The coupler according to claim 13, wherein the coupler is arranged with a core thickness at one end that corresponds to a diameter of an input fiber core and a thickness of the semi-guiding high-aspect ratio core fiber at the opposite end.

15. The coupler according to claim 14, wherein the core thickness is varied along the slow-axis direction to produce a collimated beam along the slow-axis direction.

16. The coupler according to claim 14, wherein the core thickness is arranged to be thickest along a longitudinal axis of the coupler and with the thickness gradually increasing along the slow-axis direction toward either edge of the core.

17. The coupler according to claim 14, wherein the planar waveguiding channel is arranged to provide a focusing effect in a plane of the channel due to a profile of the planar channel.

18. The coupler according to claim 17, wherein the focusing effect is controlled by arranging a transverse profile for a refractive index of the optical core that provides a higher refractive index near a center of the beam and a gradual reduction at an edge of the beam.

19. The coupler according to claim 12, wherein a length of the coupler is equal to a quarter-pitch distance.

20. The coupler in accordance with claim 12, wherein the coupler is configured to be directly attached at either end to the high-aspect ratio core fiber and to the circular core fiber.

21. The coupler in accordance with claim 20, wherein the coupler is directly attached by bonding, splicing, and/or fusing the coupler to the high aspect ratio core fiber and to the circular core fiber.

22. The coupler in accordance with claim 12, wherein the coupler enables a monolithic architecture between the high aspect ratio fiber and the circular core fiber.

23. The coupler in accordance with claim 12, wherein the optical core is an active core.

24. The coupler in accordance with claim 12, wherein the optical core is a passive core.

25. A method of coupling a signal beam from a rectangular-core fiber having a narrow, fast-axis direction and a wide, slow-axis direction to a circular-core cross section fiber, the method comprising:
providing an optical coupler having an optical core having a high-aspect ratio cross section;
propagating the signal beam through the optical core in a narrow, fast-axis direction while maintaining a size and a divergence of the signal beam; and
changing the signal beam size while producing a collimated beam in a wide, slow-axis direction.

26. The method in accordance with claim 25, comprising:
attaching the coupler directly at either end to the high-aspect ratio core fiber and to the circular core fiber.

27. The method in accordance with claim 26, wherein the coupler is directly attached by bonding, splicing, and/or fusing the coupler to the high aspect ratio core fiber and to the circular core fiber.

28. The method in accordance with claim 25, wherein the coupler enables a monolithic architecture between the high aspect ratio fiber and the circular core fiber.

29. The method in accordance with claim 25, wherein the optical core is an active core.

30. The method in accordance with claim 25, wherein the optical core is a passive core.

31. A coupler configured to couple a single-transverse-mode signal beam emerging from a high-aspect ratio rectangular core fiber to a circular core fiber, the coupler comprising:
an optical coupler including an optical core having a high aspect ratio cross section, wherein
the optical coupler is arranged to propagate the signal beam through the optical core in a narrow, fast-axis direction while maintaining a size and a divergence of the signal beam,
wherein the optical coupler is arranged to collimate and narrow in size the signal beam in an initially wide, slow-axis direction.

32. The coupler in accordance with claim 31, wherein the coupler is configured to be directly attached at either end to the high-aspect ratio core fiber and to the circular core fiber.

33. The coupler in accordance with claim 32, wherein the coupler is directly attached by bonding, splicing, and/or fusing the coupler to the high aspect ratio core fiber and to the circular core fiber.

34. The coupler in accordance with claim 31, wherein the coupler enables a monolithic architecture between the high aspect ratio fiber and the circular core fiber.

35. The coupler in accordance with claim 31, wherein the optical core is an active core.

36. The coupler in accordance with claim 31, wherein the optical core is a passive core.

37. The method of claim 1, wherein the expanding the signal beam size is controlled by a lensing action of the optical coupler.

38. The method of claim 37, wherein the lensing action includes varying a thickness of the optical core in the narrow, fast-axis direction.

39. The method of claim 37, wherein the lensing action includes applying a transverse refractive-index in the wide, slow-axis direction of the optical core.

40. The method of with claim 37, wherein the lensing action includes applying a spatially varying strain to the optical core.

41. The coupler of with claim 12, wherein the signal beam is expanded in size by a lensing action of the optical coupler.

42. The coupler of claim 41, wherein the lensing action includes varying a thickness of the optical core in the narrow, fast-axis direction.

43. The coupler of with claim 41, wherein the lensing action includes applying a transverse refractive-index in the wide, slow-axis direction of, the optical core.

44. The coupler of with claim 41, wherein the lensing action includes applying a spatially varying strain to the optical core.

* * * * *